United States Patent Office 3,062,516
Patented Nov. 6, 1962

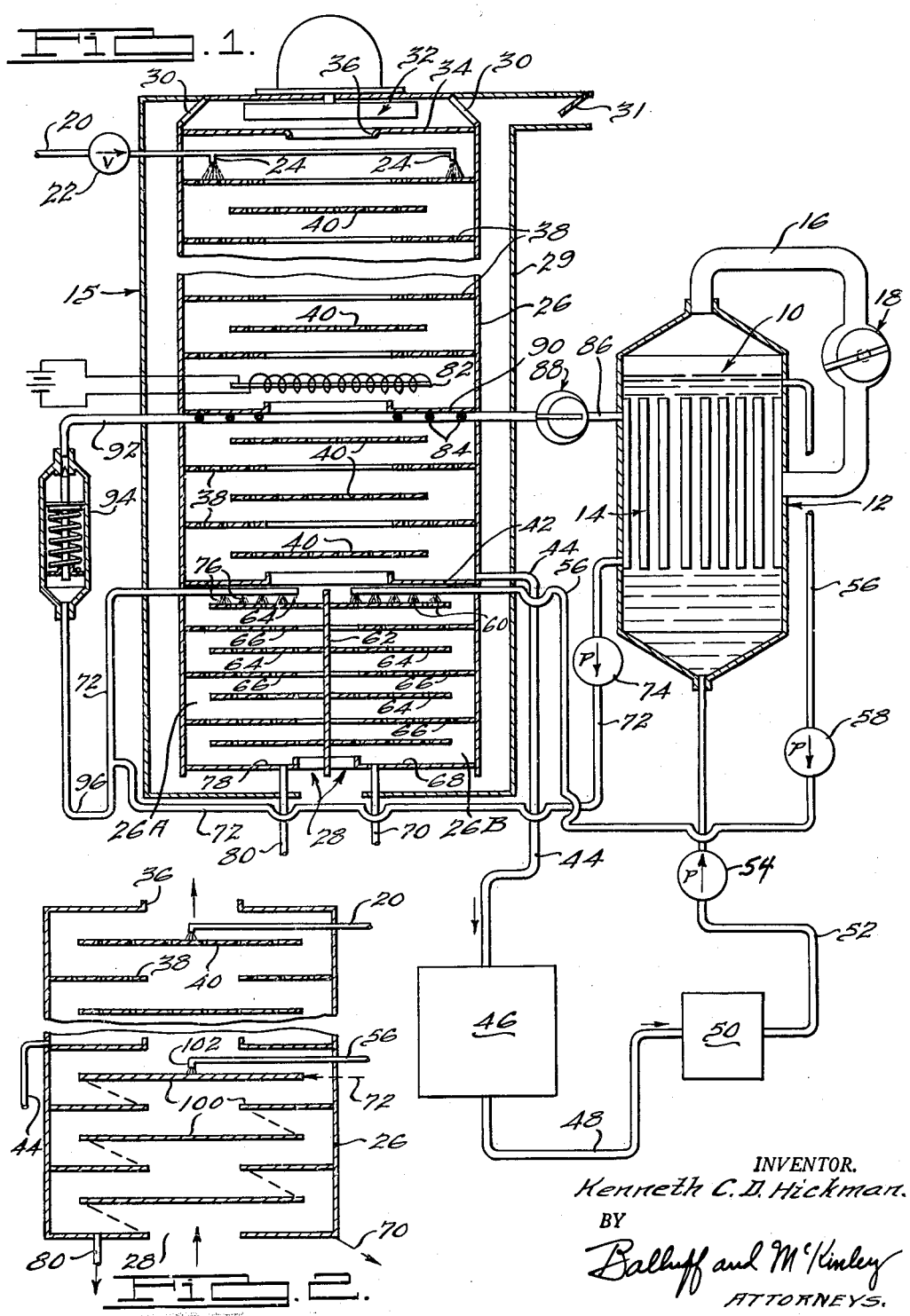

3,062,516
HEAT EXCHANGE
Kenneth C. D. Hickman, 136 Pelham Road,
Rochester 10, N.Y.
Filed July 1, 1959, Ser. No. 824,333
9 Claims. (Cl. 261—22)

This invention relates to the art of heat exchange between liquid streams, and is useful in the heating of water where it is important to avoid deposition of scale on the heat transfer surfaces and to reduce the content of foreign gases in such water.

The invention is particularly useful as a precursor to the distillation of potable water from crude water, such as sea or brackish water. Besides preheating, many crude waters require removal of carbon dioxide and other dissolved gases where economy in heat and power consumption is important. Heat exchangers commonly in use have a tendency to acquire scale and are expensive. Currently available techniques for degassing are not particularly effective for the removal of carbon dioxide. The invention provides an extremely simple and efficient arrangement for transferring heat from the effluent of the still to the feed therefor, and for pretreating the feed so as to degas the same by effectively removing carbon dioxide and other dissolved gases.

A principal object of the invention is to provide an efficient, simple and inexpensive heat exchanger for heating liquids with heat recovered from other liquid streams.

Another object of the invention is to provide a novel and efficient means for preheating liquids so as to degas the same and to efficiently preheat such liquid with heat recovered from other liquid streams.

Another object of the invention is to provide a new and improved means for degassing the feed for stills so as to effectively remove carbon dioxide and other entrained gases from the feed.

Another object of the invention is to provide a novel and simple heat exchanger which is particularly adapted for use in stills whereby heat can be efficiently recovered from the effluent and transferred to the feed.

Other and further objects of the invention will be apparent from the following description and claims and may be understood by reference to the accompanying sheet of drawings, which by way of illustration shows preferred embodiments of the invention and what I now consider to be the best mode of applying the principles thereof. Other embodiments of the invention may be used without departing from the scope of the present invention as set forth in the appended claims.

In the drawings:

FIGURE 1 is a schematic illustration of a vapor compression still and heat exchanger embodying the invention; and FIGURE 2 is a fragmentary schematic view illustrating a modified form of heat exchanger.

In the illustrated heat exchanger embodying my invention, a carrier gas is passed through an elongated channel wetted countercurrently by a stream of hot liquid, where such gas and liquid are brought into intimate contact over a large area and the gas absorbs sensible heat and vapor carrying latent heat of evaporation. The resulting warmed mixture of gas and vapor is then conveyed through a second elongated channel in intimate contact with a second stream of liquid passing countercurrently which absorbs both the sensible heat of the carrier gas and the latent heat of the condensing vapor. I have found that a heat exchanger embodying my invention operates at its best when the vapor pressure is slightly below the pressure of the carrier gas supplied to the exchanger. Thus all significant heat transfer is between one fluid stream and another so that all interfacial scaling and corrosion is obviated.

As illustrated in the drawings, a distillation apparatus embodying my intention includes an evaporator 10, a condenser 12, a heat exchange and phase separation barrier 14 separating the fluids in the evaporating chamber from the fluids in the condensing chamber and providing for the transfer of heat therebetween, and a heat exchanger-degasser 15. While the evaporator, condenser and heat exchanger 14 of the vapor compression still shown are of the type illustrated in Kleinschmidt Patent No. 2,185,595, the invention is also adapted for use in centrifugal vapor compression stills as shown in my prior United States Patent No. 2,734,023, issued February 7, 1956, for "Compression Distillation Method and Apparatus," and in other types of stills.

The vapor evolved in the evaporator 10 is withdrawn through the conduit 16, compressed by the steam compressor 18, and thence discharged into the condenser 12. The heat exchanger 14, which as shown consists of a plurality of spaced parallel tubes, serves to transfer heat from the condenser 12 to the liquid in the evaporator 10 for evaporating the same. Sufficient heat is added at the beginning of the cycle to initiate the operation of the still, and thereafter to compensate for heat losses during operation.

The liquid feed for the still is supplied through a conduit 20 under the control of a valve 22 to a series of spray nozzles 24 arranged inside of a vertical casing 26 of the heat exchanger-degasser 15 in which the feed is pretreated before passing to the evaporator of the still. The casing 26 defines an elongated flow path, channel or stack having a gas inlet 28 and a gas discharge provided by a series of outlet openings 30. A motor driven blower 32 arranged at the upper or discharge end of the casing 26 is operative to effect the flow of a stream of carrier gas upwardly through the path formed by the interior of the casing 26. The gas circulated through the casing 26 may be air, in which event the inlet 28 and outlets 30 may communicate with atmosphere. However, any other suitable carrier gas may be employed, in which event the interior of the casing may form part of a continuous path through which such gas is continuously circulated. Thus, a shroud 29 may return to the inlet 28 all or part of the gas discharged through outlets 30, depending on the extent of opening of discharge valve 31.

A baffle 34 disposed across the upper end of the casing 26 provides a gas inlet 36 to the blower 32. The interior of the casing is provided with two series of baffles 38 and 40 in the upper or heating portion thereof on which the liquid discharged from the spray nozzles 24 is distributed as it flows downwardly through the casing into the collecting tray 42 and countercurrent relative to the gas flow. The annular baffles 38 alternate with the circular baffles 40. A conduit 44 conducts liquid from the tray 42 to a filter 46 consisting of a bed of sand or stones, and a conduit 48 conducts liquid from the filter 46 to a fine filter 50 from which liquid is pumped through a conduit 52 by pump 54 to the lower end of the evaporator 10. Residue liquid from the evaporator is pumped through conduit 56 by a pump 58 to a series of spray nozzles or jets 60 within the casing below the tray 42. A partition 62 divides the interior of the casing 26 below the tray 42 into two parallel gas flow paths 26A and 26B.

A series of horizontal circular baffles 64 alternating with a series of annular baffles 66 disposed across the lower end or cooling portion of the casing 26 serve to distribute and spread the residue liquid discharged from the spray nozzles 60 as it flows downwardly through the path 26B countercurrent to the gas flowing upwardly therethrough. A tray 68 in the lower end of the casing collects the residue and a conduit 70 is connected to the tray for conducting away the collected residue.

The distillate condensed in the condenser 12 is pumped by a pump 74 through conduit 72 to a series of spray nozzles or jets 76 which are arranged to discharge such liquid into the gas flow path 26A on one side of the partition 62 whereby such liquid will be distributed by the plates and baffles 64 and 66 in its countercurrent flow in contact with the gas flowing through the passage 26A on one side of the partition 62. After flowing downwardly through the passage 26A, the distillate is collected in the tray 78 from whence it is conducted by conduit 80. Partition 62 separates the residue liquid from the distillate liquid. The routing of the distillate through the degasser serves to aerate the distillate.

For some applications, additional heat may be supplied to the liquid heating portion of the degasser and heat exchanger 15 by any suitable means, such as an electric resistance heating element 82; or by a steam coil 84 supplied through conduit 86 with steam from the upper part of the condenser or any other suitable source. Thus a compressor 88 arranged in conduit 86 may be provided for compressing the steam supplied through the conduit 86 from the still to a sufficient pressure and corresponding saturated steam temperature to raise the temperature of the feed liquid flowing downwardly through the heating portion of the casing 26 to a desired temperature, say, for example, 160° F. A tray 90 may be arranged in heat exchange relation with the coil 84 whereby the feed which collects in the tray may be heated by the coil 84. The coil is connected to conduit 92 having a pressure relief valve 94 arranged therein, the lower end of the conduit 92 being arranged in the form of a loop 96 forming a liquid trap and connected to the conduit 72. The withdrawal of steam from the upper end of the condenser 14 through the conduit 86 serves to purge the condensing side of the still, to remove heat therefrom, and to aid in heating the feed water flowing downwardly through the casing 26. Where commercial steam is available and especially for large installations, steam may be admitted directly into the lower end of the liquid heating portion of the degasser casing 26.

From the foregoing it will be evident that heat will be transferred from the hot distillate and residue effluents to the gas flowing in contact therewith upwardly through the casing 26, and that such gas will in turn transfer heat to the feed flowing in contact therewith downwardly through the upper portion of the casing 26. Given a suitable relationship between the gas velocity and heat in the region of the interface with the liquid, a commercially attractive heat exchanger is feasible. While the gas circulated upwardly through the casing 26 carries part of the heat, the greater fraction thereof is likely to be transferred by evaporation from the hot streams in the lower or cooling part of the casing and condensation on the cold liquid stream in the upper or heating part of the casing. During its passage through the heating portion of the heat exchanger and degasser casing 26, the feed liquid is heated above the decomposition point of any bicarbonate present, and carbon dioxide is driven off and removed by the upwardly flowing gas stream.

The distribution and spreading of the liquid on the baffles or plates within the casing 26 may be enhanced by rotating either or both series of plates, which preferably are perforated.

To avoid evaporation and entrainment of the distillate with the gas flowing through the casing 26, the distillate may be passed through a series of hollow heat exchange plates or coils 100 over which the residue is flowing, the residue being discharged by a spray nozzle 102 onto the upper surface of the upper one of the plates 100, as shown in FIG. 2. The remainder of the apparatus illustrated in FIG. 2 may conform with the still as shown in FIG. 1.

As previously mentioned, it is not necessary that air at atmospheric pressure or that air at all be used as the gaseous carrier of the water vapor. Hydrogen or helium may be substituted in a substantially closed system to lighten the load on the blower. I have found it desirable to use air at reduced pressure which lowers the blower load and facilitates the evaporation and condensation of water, and hence the overall coefficient of heat transfer. As a preferred example, I contemplate the operation of the heat exchanger with air at a slightly higher pressure (10–20%) than the saturated vapor pressure of the hottest portion of the effluent. At 150° F. the air pressure would be about 4 lbs. absolute or about 22 inches of vacuum. The reduced pressure will greatly facilitate the removal of dissolved gases from the feed liquid. The recirculated air at reduced pressure would be continuously purged by chemical means or by the gradual replacement with fresh air.

For some application it may be desirable to employ additional degasser and/or heating means for the feed immediately before entry of the feed into the still. My prior application Serial No. 511,067, filed May 25, 1955, now Patent 2,899,366, for Compression Distillation discloses a degassing and a heating means which could be used in this instance.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. Heat exchange apparatus for transferring heat from one liquid to another comprising a casing defining an elongated gas flow path, means for effecting the flow of a stream of gas upwardly through such path, means for discharging a first liquid into such flowing gas stream at the upper end of said path and causing such first liquid to flow countercurrent to and in contact with such flowing gas stream so as to absorb heat therefrom, means intermediate the ends of such path for separating such first liquid from the gas stream, and means for discharging a second liquid into such gas stream upstream relative to said separating means and causing such second liquid to flow countercurrent to and in contact with such flowing gas stream so as to transfer heat thereto.

2. Heat exchange apparatus comprising a casing defining an elongated vertical gas flow path, means for effecting the flow of a stream of gas upwardly through such path, means for discharging liquid to be heated into such flowing gas stream at the upper end of said path and causing such liquid to flow countercurrent to and in contact with such flowing gas stream so as to absorb heat therefrom, means intermediate the ends of such path for separating such liquid from the gas stream, and means for discharging liquid to be cooled into such gas stream upstream relative to said separating means and causing such liquid to be cooled to flow countercurrent to and in contact with such flowing gas stream so as to transfer heat thereto.

3. Heat exchange apparatus comprising a casing defining an elongated gas flow path, means for effecting the flow of a stream of gas through such path, means for discharging liquid to be heated into such flowing gas stream at the discharge end of said path and causing such liquid to flow countercurrent to and in contact with such flowing gas stream so as to absorb heat therefrom, means intermediate the ends of such path for separating such liquid from the gas stream, and means for flowing liquid to be cooled in heat exchange relation with such gas stream upstream relative to said separating means and causing such liquid to be cooled to flow countercurrent to such flowing gas stream so as to transfer heat thereto.

4. Heat exchange apparatus comprising a vertical gas flow path, a blower to effect the flow of a gas stream through such path, a first stream of liquid to be heated flowing in contact with such gas stream through the upper portion of said path so as to be heated thereby and a second stream of liquid to be cooled flowing in contact with such gas stream upstream relative to said first liquid stream so as to be cooled thereby.

5. Apparatus according to claim 4 wherein said blower effects the upward flow of said gas stream through said path.

6. Apparatus according to claim 4 wherein said blower effects the upward flow of said gas stream through said path and wherein said liquids flow countercurrent relative to said gas stream.

7. Apparatus according to claim 4 including provisions for recirculating at least part of said gas stream through said path.

8. Heat exchange apparatus comprising a first path of flow of liquid to be heated, a second path of flow for liquid to be cooled, and means for flowing a stream of gas through said second path countercurrent to and in contact with the flowing liquid therein so as to be heated thereby and thence through said first path countercurrent to and in contact with the flowing liquid therein for heating the latter.

9. Heat exchange apparatus according to claim 8 wherein said paths are vertically disposed and provided with means for spreading and distributing such liquids in their flow through their respective paths.

References Cited in the file of this patent

UNITED STATES PATENTS

| | | |
|---|---|---|
| 2,636,129 | Agnew | Apr. 21, 1953 |
| 2,678,199 | Koch | May 11, 1954 |
| 2,734,023 | Hickman | Feb. 7, 1956 |
| 2,856,171 | Otto | Oct. 14, 1958 |
| 2,868,524 | Annable et al. | Jan. 13, 1959 |